(12) United States Patent
Adams

(10) Patent No.: US 6,400,814 B1
(45) Date of Patent: Jun. 4, 2002

(54) TELEPHONE WITH RINGER SILENCER SCREENING FEATURE

(75) Inventor: Joel Adams, Pflugerville, TX (US)

(73) Assignee: Siemens Information and C Communication Mobile, LLC, San Diego, CA (US)

( * ) Notice: Subject to any disclaimer, the term of this patent is extended or adjusted under 35 U.S.C. 154(b) by 0 days.

(21) Appl. No.: 08/982,875

(22) Filed: Dec. 2, 1997

(51) Int. Cl.[7] .......................... H04M 1/56; H04M 15/06
(52) U.S. Cl. ............................ 379/142.01; 379/142.04; 379/142.17; 379/376.02; 455/415; 455/566; 455/575
(58) Field of Search ........................ 379/142, 372–377, 379/215, 201, 88, 211–212, 67–68, 102.01–102.03, 110.01, 142.01, 142.04, 142.07, 215.01, 201.01, 88.19–88.21; 455/567, 415, 566, 575

(56) References Cited

U.S. PATENT DOCUMENTS

| 4,384,171 A | | 5/1983 | Klee ............................ 179/84 |
| 4,385,295 A | * | 5/1983 | Willard et al. ......... 340/825.44 |
| 5,191,607 A | * | 3/1993 | Myers et al. ................ 379/373 |
| 5,327,486 A | * | 7/1994 | Wolff et al. .................. 379/142 |
| 5,351,289 A | | 9/1994 | Logsdon et al. ............. 379/142 |
| 5,473,667 A | * | 12/1995 | Neustein .................... 455/31.2 |
| 5,497,413 A | * | 3/1996 | Nakano ....................... 379/142 |
| 5,533,102 A | * | 7/1996 | Robinson et al. ........... 379/142 |
| 5,604,797 A | * | 2/1997 | Adcock ....................... 379/373 |
| 5,619,568 A | * | 4/1997 | Miller ......................... 379/373 |
| 5,751,793 A | * | 5/1998 | Davies et al. ............... 379/142 |
| 5,781,613 A | * | 7/1998 | Knuth et al. ................ 379/142 |
| 5,805,587 A | * | 9/1998 | Norris et al. ................. 379/67 |
| 5,812,648 A | * | 9/1998 | Wanner ....................... 379/142 |

* cited by examiner

Primary Examiner—Duc Nguyen

(57) ABSTRACT

A telephone with a ringer silencer call screening feature includes a ringer for indicating the receipt of an incoming call. A ringer control unit deactivates the ringer while the telephone is in a continuous on-hook state and reactivates the ringer upon termination of the incoming call. A call control unit for transmitting and receiving call signaling messages is connected to the ringer control unit for communication with the ringer control unit. Multiple keypads provide an interface between a user of the telephone and both the call control unit and the ringer control unit. A display connected to the ringer control unit and the call control unit displays caller identification information and a call status detector communicates with the ringer control unit upon termination of the incoming call. One method for screening calls includes utilizing one of the keypads to cause the ringer control unit to locally deactivate the ringer. Another method includes utilizing one of the keypads to cause the call control unit to transmit a transfer-to-voicemail message to a central office.

14 Claims, 5 Drawing Sheets

TELEPHONE WITH RINGER SILENCER SCREENING FEATURE

BACKGROUND OF THE INVENTION

The invention relates generally to a method and device for screening incoming telephone calls and more specifically to a telephone with a ringer silencer capable of activation after reception of an incoming call.

DESCRIPTION OF THE RELATED ART

A common problem which accompanies the increasing presence of telephone equipment in almost every aspect of modern society is the interruption which these devices can cause when they receive an unwanted incoming telephone call. Telephone communication has become so important, particularly with the increasing popularity of cellular phones, that continuous access to telephone communication has become the norm. As reliance on telephone communication increases, so does the need to avoid unnecessary interruptions caused by unwanted telephone calls.

Numerous solutions to the problem of handling unwanted telephone calls have been developed, ranging from simple home remedies to sophisticated screening devices. The simplest solution is to disconnect the line that links the phone to the network which supports telecommunications for a particular telephone. Another solution involves manually deactivating a ringer which signals the presence of an incoming call. Both of these solutions require that the user remember to reconnect the phone or manually reactivate the ringer at the point when the user desires to once again receive phone calls. Thus, human error can cause important calls to go unanswered even after the time period during which the user wishes to be undisturbed if the user forgets to reactivate the ringer or reconnect the phone.

A more advanced solution is provided by U.S. Pat. No. 4,384,171 to Klee, which describes an automatic telephone silencer connected to a timer. The timer causes the ringer of a phone to be deactivated at a predetermined time and to be reactivated after a predetermined interval. Although the timed automatic telephone silencer eliminates the problem of manual deactivation and reactivation of the ringer, the silencer indiscriminately screens out all calls, so that an important call goes unanswered because the user is unaware of the identity of the caller.

Utilizing a voicemail system to answer a phone enables the user to identify the caller. The user allows the phone to ring through until a voicemail device answers the call. The user can then answer the call personally, if the user so chooses, based upon the identification of the caller revealed in the voicemail message. However, this method of screening compounds the disruption of a ringing phone by adding the distraction of a voicemail message.

With the introduction of caller identification (caller ID), a more sophisticated call screening device is possible. U.S. Pat. No. 5,351,289 to Logsdon et al. describes a caller ID telephone security device which mutes the ringer of a phone until the caller ID of the incoming call can be ascertained. Upon determining the caller ID, the device compares the phone number to a list of phone numbers to determine whether to activate the ringer. In this manner the user can avoid interruption by unwanted phone calls while allowing other important phone calls to pass through. Though this invention represents a significant improvement over prior screening devices, it requires that a user predetermine which calls are to be screened and which calls are to be passed through. Should the user forget to make a determination on a particular phone number, an unwanted call might pass through or an important call might be screened out.

What is needed is a device and method for enabling a user to temporarily silence the ringer of a phone after an incoming call has activated the ringer and the caller identification information has been ascertained without having to wait for a predetermined time interval until either a voicemail system answers the call or the call is terminated.

SUMMARY OF THE INVENTION

A telephone with a ringer silencer call screening feature includes a ringer or other call-indicator for indicating receipt of an incoming call and includes a control unit that allows a user to selectively disable the ringer on a call-by-call basis. The control unit causes temporary deactivation of the ringer during an uninterrupted on-hook state of the telephone subsequent to activation of the ringer by receipt of the incoming call. The deactivation of the ringer automatically terminates upon conclusion of the incoming call. A control unit interface is connected to the control unit to enable a user to selectively deactivate the ringer, and a display is connected to the control unit to display the caller identification information.

In a preferred embodiment of the invention, the ringer silencer function is performed locally by the control unit, which includes a ringer silencer connected to the ringer, a ringer reactivator for reactivating the ringer upon termination of the call, and a call status detector for signaling to the ringer reactivator upon conclusion of the call. The control unit is responsive to a keypad that triggers the ringer silencer when depressed. The display is preferably configured to present a mute ringer icon which is representative of the triggering keypad to indicate the assignment of a mute ringer function to the keypad.

In another embodiment, the mute ringer function is performed by signaling telecommunications switching equipment, such as a central office or equipment of a private branch exchange. The control unit includes a transmitter for transmitting a transfer-to-voicemail message to a central office which causes the call to be transferred from the telephone. The control unit is responsive to a keypad that triggers transmission of the transfer message. The display presents a transfer-to-voicemail icon which represents assignment of a transfer-to-voicemail function to the keypad.

A third embodiment of the invention combines aspects of the first and second embodiments to provide a user of the telephone with the option of choosing whether to silence the ringer locally by implementing the mute ringer function or by implementing the transfer-to-voicemail function.

A method for screening incoming calls on a telephone includes receiving an incoming call over a telephone network and displaying caller identification information for the incoming call. A determination is made whether to answer the call based upon the caller identification information. If the determination is made not to answer the call, then the ringer is temporarily silenced while the phone remains in an uninterrupted on-hook state until the call is terminated. The ringer silencing can be performed either by opening a switch between the ringer and a ringer signal generator or by transmitting a transfer-to-voicemail signal to a central office which transfers the call to a remote site enabled for voicemail functions.

DETAILED DESCRIPTION

Figure 1:
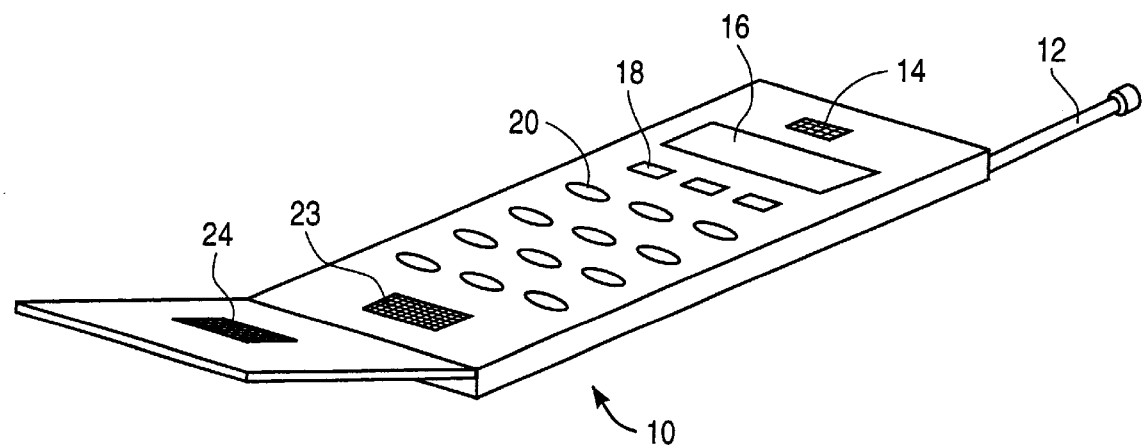
FIG. 1 is a perspective view of a cellular phone according to the claimed invention.
Figure 2:
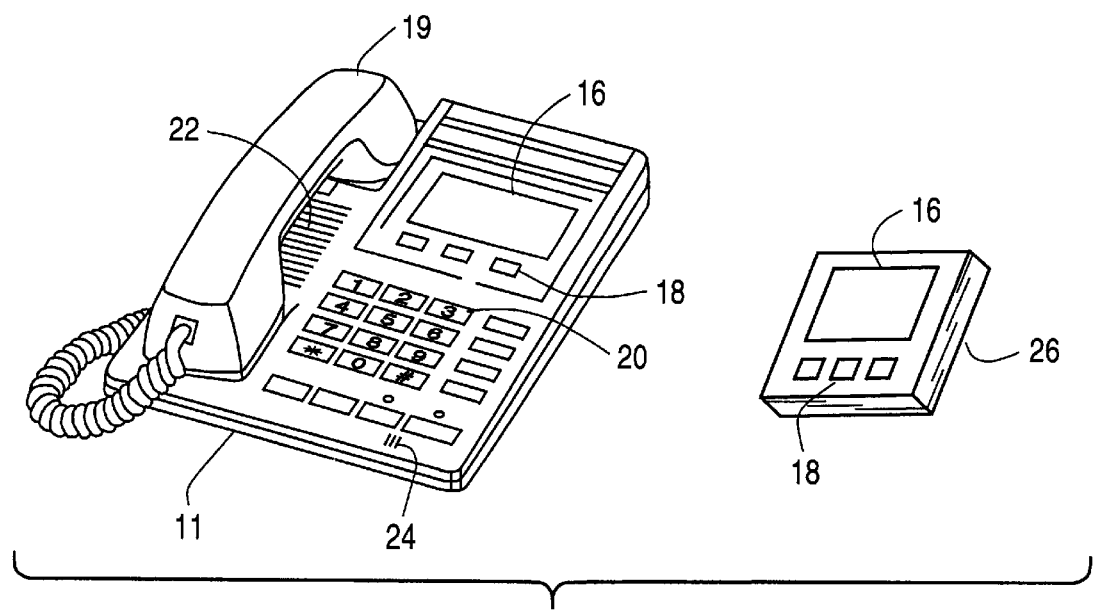
FIG. 2 is a perspective view of a conventional desktop telephone according to the claimed invention.

With reference to FIGS. 1 and 2, a digital cellular phone 10 and a conventional desktop telephone 11 are linked to a telephone network, not shown, that supports telecommunications connectivity with the phones. A digital cellular phone is preferred over an analog cellular phone because its superior signaling capabilities are better suited to implement the silencer features to be described below. An antenna 12 is attached to the cellular phone to enable reception of telephone signals from a central office or a signal relay station. Each phone includes at least one speaker 14 and 22 to enable the user of the telephone to hear speech transmitted over the network. Two modes of exchanging voice information are provided for communicating via the conventional desktop telephone of FIG. 2. The handset 19 conventionally includes both a microphone and a speaker that may be used in the first mode, or a speaker phone function can be employed utilizing the speaker 22 and microphone 24 located on the body of the conventional desktop telephone 11. A liquid crystal display (LCD) 16 or an equivalent display enables a user of the telephone 10 and 11 to view caller identification (ID) information as well as various icons indicating the assignment of functions to soft keys 18 positioned below the LCD. The caller identification information preferably includes the name of the calling party. However, call number indicator information can suffice to implement the silencer features. Digit keypads 20 are provided to enable a user to enter the telephone number of a remote endpoint. The soft keys 18 are positioned below the LCD 16 so that multiple icons can be displayed over each of the soft keys, thereby increasing the number of functions which can be assigned to each soft key so as to reduce the surface area on the telephone occupied by the soft keys.

An indicator circuit, not shown, such as a ringer circuit, is located within each telephone 10 and 11 to indicate receipt of an incoming call. Typically, the ringer circuit is connected to the speaker 22, but the cellular phone 10 is shown as having a separate ringer 23. Alternatively, the LCD 16 and digit keypads 20 can be backlit and programmed to flash to indicate receipt of an incoming call during a silent ring mode. Optionally, the conventional desktop telephone 11 can be equipped with a remote control device 26 to enable a user to view the LCD 16 and to utilize the soft keys 18 when the user is not able to reach the telephone in a timely manner after it has begun ringing.

The telephones 10 and 11 in FIGS. 1 and 2 can be connected to any telephone network, digital or analog, including but not limited to a standard analog telephone network, an ISDN, an Internet Protocol telephony network, and a T-1 carrier. Although FIGS. 1 and 2 illustrate a cellular telephone and a conventional telephone, any telephonic device can be configured to practice the claimed invention, including a personal computer configured for telephonic communication.

Figure 3:
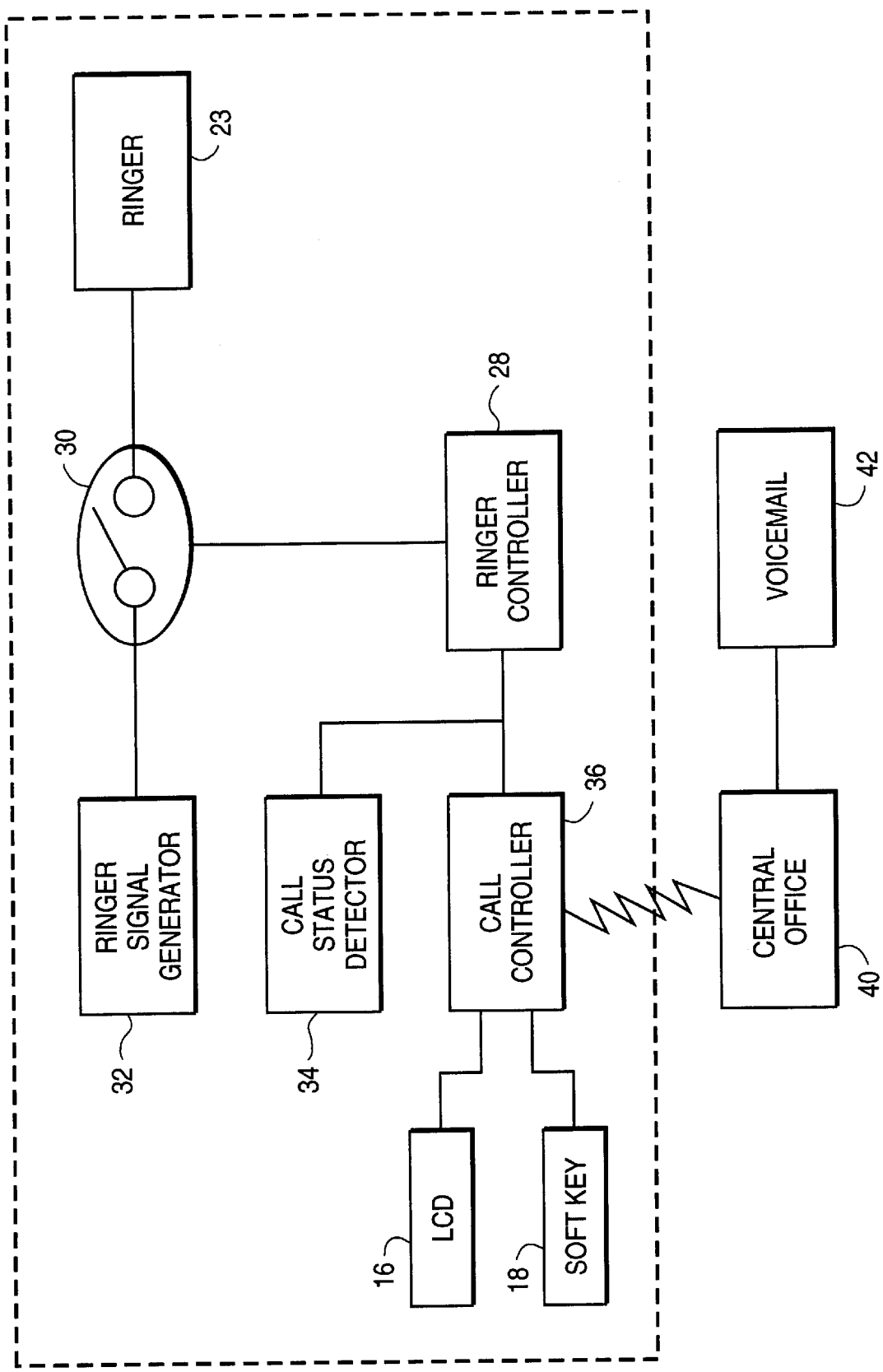
FIG. 3 is a block diagram of the cellular phone shown in FIG. 1 wherein the phone possesses local mute ringer capability.

FIG. 3 illustrates a telephone equipped with a local mute ringer function. A call controller 36 transmits and receives signaling messages to and from a central office 40. For instance, the call controller transmits a message to the central office 40 containing the telephone number of a remote endpoint when the user attempts to place a telephone call. Furthermore, when the telephone 10 receives a call from a remote telephone (not shown), the call controller 36 may receive caller ID information from the central office. The call controller is connected to the LCD 16 to display the caller ID information to the user. The call controller also causes various icons to be displayed on the LCD 16 above the soft keys 18 in response to an incoming call. These icons include a mute ringer icon, the function of which will be discussed below. The call controller is also connected to a ringer signal generator 32 to activate the ringer 23 upon receipt of an incoming telephone call. As discussed above, when the telephone receives an incoming telephone call, the call controller is the component of the telephone which receives the call signaling messages from the central office. Upon receipt of call signaling messages, the controller 36 processes these messages and instructs the ringer signal generator 32 to activate the ringer 23.

Upon receipt of an incoming telephone call, the call controller 36 also assigns a mute ringer function to one of the soft keys 18. The mute ringer icon is presented on the LCD 16 to indicate to the user that the soft key 18 has been assigned the mute ringer function, so that depressing the soft key causes temporary deactivation of the ringer. The soft key is connected to a ringer controller 28 which in turn is connected to a switch 30, connected to the ringer signal generator 32 and the ringer 23. Depression of the mute ringer soft key 18 causes the ringer controller 28 to open the switch 30, so that the ringer signal generator is no longer capable of communicating with the ringer. Consequently, the ringer is muted. Alternatively, the ringer controller could directly signal to the ringer signal generator to stop generating and transmitting ringer signals to the ringer 23. A call status detector 34 is connected to the call controller 36 and the ringer controller 28. The call controller receives a message from the central office 40 when the incoming call is either transferred from the telephone 10 or is terminated prior to being transferred. The call status detector is responsive to the message containing the call transfer or termination data and signals to the ringer controller 28 accordingly. Upon receipt of a call transfer or termination signal from the call status detector, the ringer controller causes the switch 30 to close, thereby reestablishing communicative contact between the ringer signal generator 32 and the ringer 23. Thus, the election to trigger the mute ringer function (i.e., the indicator-disabling mode of the telephone) is executed on a call-by-call basis.

Returning briefly to FIG. 2, the remote control device 26 enables the user to ascertain the caller ID information and mute the ringer of the conventional desktop telephone 11 without the disruption of having to cross a room to read the information on the LCD of the telephone. Whereas the cellular telephone is generally very accessible to the user because of its portable nature, the conventional desktop telephone might be located within the same room but at some distance from the user. The LCD 16 and the soft keys 18 of the remote control device 26 are equipped for wireless communication with the call controller 36 and the ringer controller 28. The means for such wireless communication are well known.

FIG. 3 shows the central office connected to a site enabled for voicemail functions. The telephone protocol preferably includes a voicemail feature whereby, after a predetermined time interval, the central office 40 automatically transfers an incoming call to the voicemail site 42 and the caller has the option of leaving a message. One benefit which the local mute ringer function described above provides is that the caller is unaware that the call is being screened, because the central office transfers the call after the same time interval as it would had the phone simply not been answered. This feature applies equally to applications in which the telecommunications switching facility that supports calls and voicemail is equipment of a private branch exchange (PBX) or the like.

Figure 4:
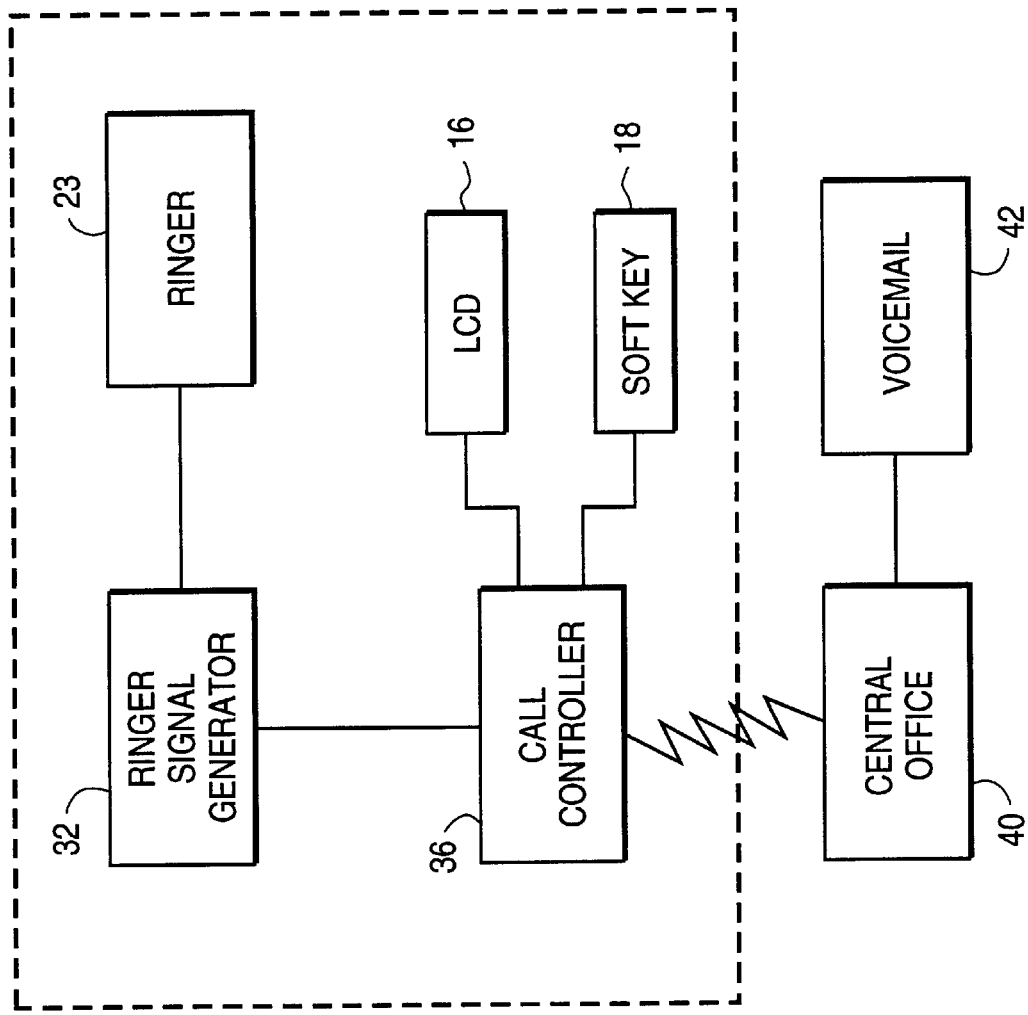
FIG. 4 is a block diagram of the cellular phone shown in FIG. 1 wherein the phone possesses transfer-to-voicemail signaling capability.

FIG. 4 illustrates a telephone with a transfer-to-voicemail signaling capability. Unlike the mute ringer function, the transfer-to-voicemail function is performed by way of communication with the central office 40, or another telecommunications switching facility, such as a PBX. The call controller 36 is enabled to mute the ringer by way of instantaneous communication with the central office 40. The call controller 36 causes the LCD 16 to display caller ID information and a transfer-to-voicemail icon upon receipt of a telephone call via the central office. The call controller 36 also assigns a transfer-to-voicemail function to a soft key 18. Depression of the transfer-to-voicemail soft key 18 causes the call controller 36 to transmit a transfer-to-voicemail message to the central office. Upon receipt of the transfer-to-voicemail message, the telephone call is switched to a remote site 42 enabled for voicemail functions. The transfer of the telephone call from the telephone causes the ringer 23 to stop ringing. The switch transmits a message indicating the transfer of the call. Upon receipt of the call transfer message, the call controller 36 directs the ringer signal generator 32 to cease sending signals to the ringer 23. An advantage provided by the telephone equipped with transfer-to-voicemail signaling capability is that the telephone can receive additional telephone calls immediately upon transfer of the incoming telephone call, whereas the telephone with local mute ringer capability cannot receive additional telephone calls until either the caller terminates the call or the call is transferred after expiration of the time-out period. A disadvantage of the telephone with instantaneous transfer-to-voicemail signaling capability is that the caller might deduce that the caller is being screened because of an abrupt transfer to voicemail.

Combining the local mute ringer function with the transfer-to-voicemail signaling capability in a single telephone provides a user with the ability to select a screening method according to the particular needs of the user. For instance, if the user is expecting an important telephone call and it is of little consequence that a caller might be offended at having a call screened, the logical choice would be to employ the transfer-to-voicemail function to free the telephone as soon as possible for the important telephone call. If on the other hand the user is not awaiting an important telephone call and prefers to discreetly screen an incoming call without knowledge of the caller, then the user employs the local mute ringer function. As discussed above, the telephone illustrated in FIG. 3 is equipped to employ the local mute ringer function. However, the telephone can also be configured to perform transfer-to-voicemail functions. The call controller 36 is connected to the ringer signal generator 32 to activate and deactivate the ringer 23. The call controller 36 is also connected to the LCD 16 and must only be configured to cause the LCD 16 to display the transfer-to-voicemail icon, to assign to the soft key 18 the transfer-to-voicemail function, and the call controller must be programmed to transmit the transfer-to-voicemail message.

Figure 5:
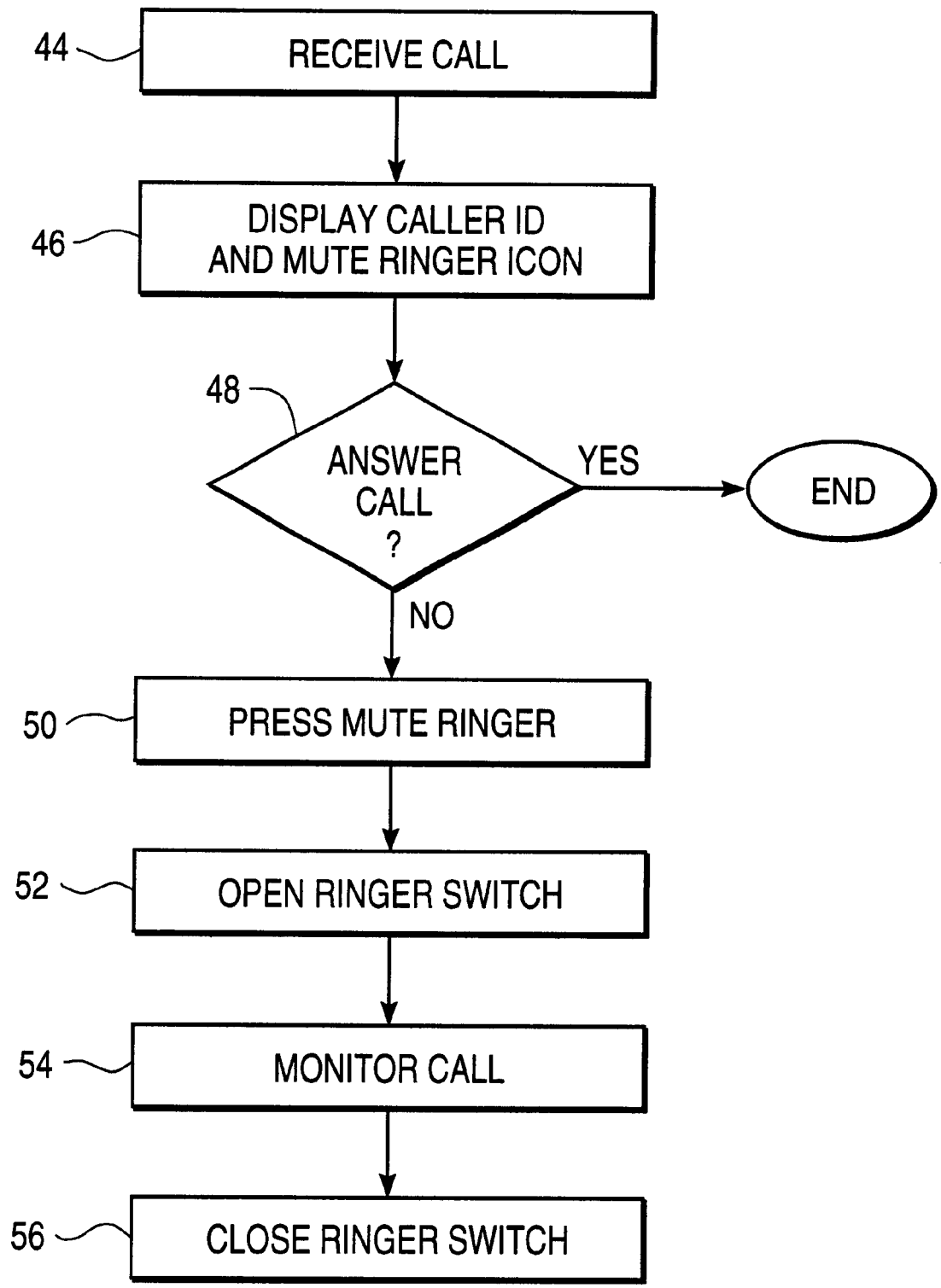
FIG. 5 is a flow diagram of a method for screening incoming telephone calls utilizing a local mute ringer function.

FIG. 5 illustrates a method for performing call screening utilizing the local mute ringer function with the telephone of FIG. 3. In step 44 a call is received by the call controller 36 from the central office 40. The call controller processes the call signaling data accompanying the call and in turn signals the LCD 16 to display the caller ID information and a mute ringer icon in step 46. The call controller 36 also causes the ringer signal generator 32 to generate and transmit ringer signals to the ringer 23. In step 48 the user decides whether to answer the call based upon the caller ID information. If the user decides to answer the call, then no further steps are taken. If the user decides not to answer the call, then in step 50 the mute ringer soft key 18 is depressed, thereby causing the ringer controller 28 to open the switch between the ringer signal generator 32 and the ringer 23 in step 52. Opening the switch prevents ringer signals generated and transmitted by the ringer signal generator from reaching the ringer. As previously discussed, an alternative to opening the switch would be to use the ringer controller 28 to signal directly to the ringer signal generator 32 not to respond to the call controller 36 by transmitting ringer signals to the ringer 23. It is important that the ringer not be deactivated for an interval longer than the duration of the call. To this end, the call status detector 34 communicates with the call controller 36 to detect the termination of the call in step 54. Upon completion of the call, the call controller 36 receives a signal from the central office 40 and the call controller causes the call status detector 34 to communicate to the ringer controller 28 that the call has been terminated or transferred. In response, the ringer controller causes the switch 30 to be closed, thereby reactivating the ringer 23 in step 56. In the alternative, the ringer controller might signal directly to the ringer signal generator 32 to resume responding to the appropriate signals from the call controller 36 by transmitting ringer signals to the ringer 23.

Figure 6:
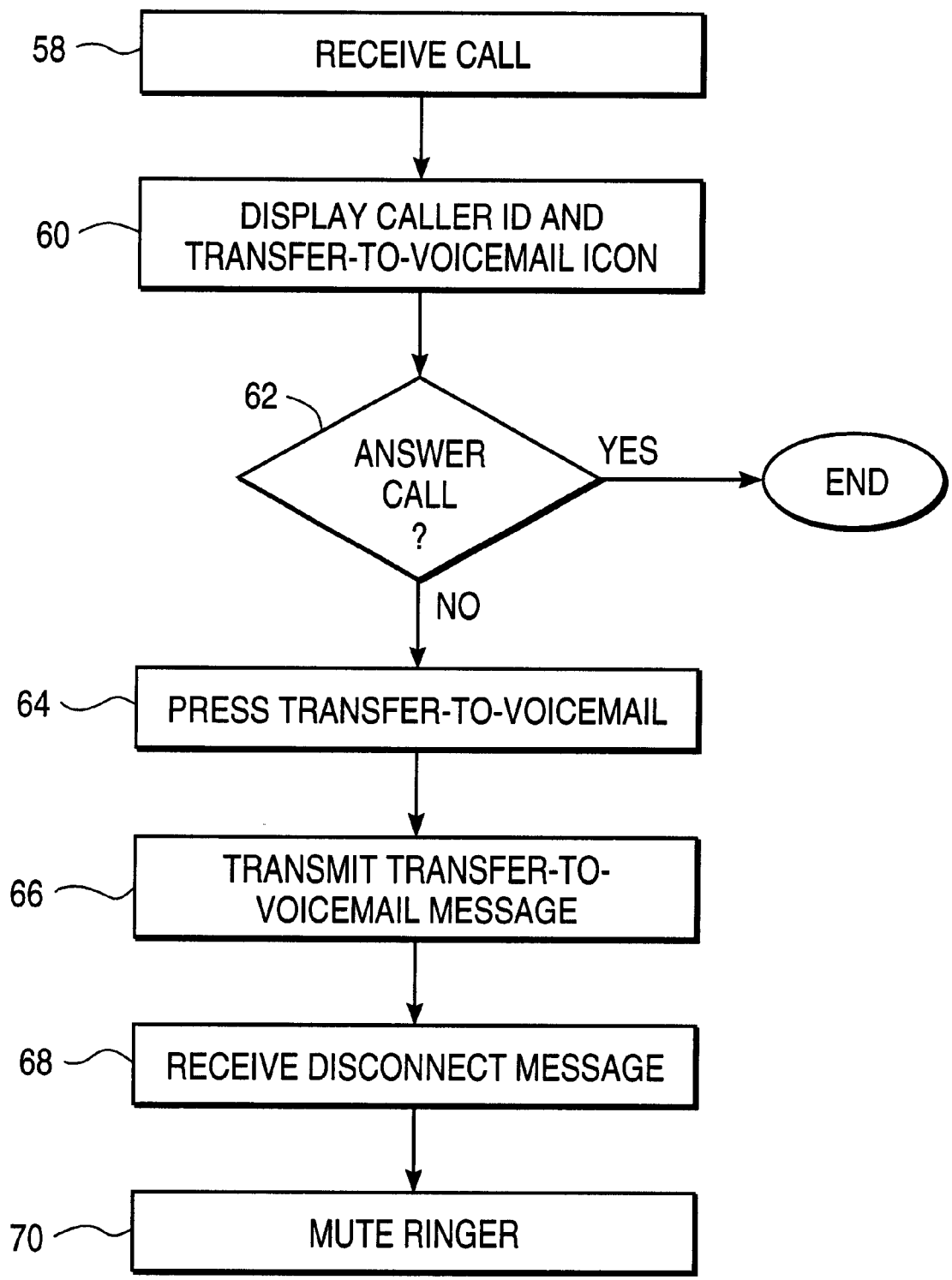
FIG. 6 is a flow diagram of a method for screening incoming telephone calls utilizing a transfer-to-voicemail signaling function.

FIG. 6 illustrates a method for screening calls employing the transfer-to-voicemail function in the telephone of FIGS. 3 and 4. In step 58 a call is received from the central office. In response to the call, the call controller 36 causes the LCD 16 to display caller ID information and a transfer-to-voicemail icon over a soft key in step 60. The call controller 36 also assigns a soft key 18 the transfer-to-voicemail function. In step 62 the user decides whether to answer the telephone call based on the caller ID information. If the user decides to answer the telephone call, then no further steps are taken. If the user decides not to answer the telephone call, then the user depresses the transfer-to-voicemail soft key 18 in step 64. In step 66, the call controller 36 then transmits a transfer-to-voicemail message in response to the depression of the soft key 18, causing the central office 40 or other remote switching facility to transfer the telephone call to a remote site 42 enabled for voicemail functions. Upon transfer of the telephone call, the switching facility transmits a disconnect message to the telephone indicating that the telephone call has been transferred. Upon receipt of the disconnect message in step 68, the call controller 36 signals to the ringer signal generator 32 to cease transmitting ringer signals to the ringer 23 in step 70.

The method and apparatus described herein for screening telephone calls provides flexible and efficient screening of unwanted telephone calls. The components which provide the ringer mute capability are integrally constructed into the telephone and so require no separate equipment. Unlike call screening devices which employ a computer to determine whether to permit a call to pass through or not, the claimed invention enables the user of the telephone to make the determination of whether to answer calls on a call-by-call basis, while knowing the origin of the calls. Additionally, the invention provides a user with two optional methods of screening. The local mute ringer function provides a discreet screening method which is transparent to the caller because, from the perspective of the caller, it appears that the call has simply been transferred after the standard number of rings. If an urgent call supercedes the need for discretion, then the user can employ the transfer-to-voicemail function which transfers the call to voicemail immediately, thereby freeing the telephone for other more important phone calls.

What is claimed is:

1. A telephone with a call screening feature comprising:
    an indicator circuit that is responsive to detection of an incoming call for indicating receipt of said incoming call when said telephone is in a continuous on-hook state;
    a control unit having an indicator-disabling mode in which said control unit temporarily deactivates said indicator circuit while maintaining said telephone in said continuous on-hook state during said incoming call, said control unit being responsive to detection of a conclusion of said incoming call to automatically terminate said indicator-disabling mode upon sensing said conclusion;
    a user-manipulable control unit interface connected to said control unit to selectively trigger said indicator-disabling mode subsequent to activation of said indicator circuit by said detection of said incoming call;
    a display connected to said control unit for displaying caller identification information indicative of an origin of said incoming call;
    a remote control device with a second control unit interface for wireless communication with said control unit to enable deactivation of said indicator circuit from a location remote from said telephone, said remote control device having a second display enabled for wireless communication with said control unit for display of said caller identification information.

2. The telephone of claim 1 wherein said indicator circuit is a ringer and wherein said control unit includes a ringer control unit connected to said ringer for reactivating said ringer upon termination of said incoming call, said control unit having a call status detector for signaling to said ringer control unit upon termination of said incoming call.

3. The telephone of claim 2 wherein said ringer control unit is connected to said ringer via a switch, closure of said switch enabling activation of said ringer and opening of said switch causing deactivation of said ringer.

4. The telephone of claim 1 wherein said control unit includes a transmitter for transmitting a transfer-to-voicemail message to telecommunications switching equipment and a receiver for receiving a disconnect message from said telecommunications switching equipment in response to said transfer-to-voicemail message, said transfer-to-voicemail message causing said incoming call to be transferred from said telephone.

5. The telephone of claim 4 wherein said control unit interface is operatively associated with a keypad with respect to initiating said indicator-disabling mode, said display being configured to display a transfer-to-voicemail icon that is representative of a transfer-to-voicemail function of said keypad.

6. The telephone of claim 1 further comprising a ringer signal generator connected to said control unit and responsive to said control unit for generating and transmitting signals to said indicator circuit for activation of a ringer.

7. A method for screening incoming calls to a telephone comprising the steps of:
    receiving an incoming call to said telephone via a telephone network, said reception of said incoming call activating a ringer on said telephone to signal current availability of said incoming call;
    displaying caller identification information indicative of an origin of said incoming call;
    during said current availability of said incoming call, enabling a user to temporarily disable said ringer on said telephone while said telephone is in an uninterrupted on-hook state; and
    if said ringer is temporarily disabled and said telephone remains in said uninterrupted on-hook state, automatically and immediately re-enabling said ringer in response to detection that said incoming call has been terminated, said step of automatically and immediately re-enabling said ringer being independent of any intermediate step.

8. The method of claim 7 wherein said temporary disabling step includes locally opening a switch between said ringer and a ringer signal generator, said opening of said switch causing deactivation of said ringer, said step of automatically re-enabling said ringer including monitoring said call to determine when said call has terminated, and, upon termination of said call, closing said switch to reconnect said ringer to said ringer signal generator, said closing of said switch enabling reactivation of said ringer.

9. The method of claim 7 wherein said temporary disabling step includes transmitting a transfer-to-voicemail message to telecommunications switching equipment, said transfer-to-voicemail message causing said incoming call to be transferred to a remote site enabled for voicemail functions, thereby triggering transmission of a disconnect message from said telecommunications switching equipment.

10. The method of claim 9 wherein said displaying step includes displaying an icon representative of a keypad to which a transfer-to-voicemail function is assigned.

11. The method of claim 7 wherein said temporary disabling step includes monitoring said incoming call to determine when said incoming call has terminated and wherein said re-enabling step includes reactivating said ringer signal generator upon termination of said incoming call, said reactivation of said ringer signal generator enabling said ringer signal generator to transmit ringer signals to said ringer.

12. A telephone with a call screening feature comprising:
    a ringer that is responsive to detection of an incoming call;
    a ringer control unit having a temporary ringer-disabling mode during said incoming call while said telephone is in an uninterrupted on-hook state after said activation of said ringer by said incoming call and having ringer re-enabling capability while said telephone is in said uninterrupted on-hook state upon termination of said incoming call;
    a call control unit having a call signaling message transmission mode and a call signaling message reception mode, wherein said call control unit is configured to transmit a transfer-to-voicemail message to a central office, said transfer-to-voicemail message causing termination of said incoming call;
    first and second telephone keypads connected to selectively trigger said ringer-disabling mode of said ringer control unit and to trigger said call signaling message transmission mode of said call control unit, said first telephone keypad being assigned a mute ringer function, said second telephone keypad being associated with a transfer-to-voicemail function;

a display connected to said ringer control unit and said call control unit for displaying caller identification information indicative of an origin of said incoming call received from said call control unit;

a status detector having an input and an output, said input connected to said call control unit and said output connected to said ringer control unit to enable transmission of call termination data to said ringer control unit upon termination of said incoming call;

a remote control device with a second control unit interface for wireless communication with said ringer control unit to enable deactivation of said ringer from a location remote from said telephone; and a second display connected to said remote control device and enabled for wireless communication with said call control unit for display of said caller identification information.

13. The telephone of claim 12 further comprising a switch connected to said ringer and said ringer control unit enabling deactivation and reactivation of said ringer.

14. A method for screening incoming calls to a telephone comprising the steps of:

(1) receiving an incoming call to said telephone via a telephone network, said reception of said incoming call activating a ringer on said telephone to signal current availability of said incoming call;

(2) displaying caller identification indicative of an origin of said incoming call;

(3) during said current availability of said incoming call, enabling a user to temporarily disable said ringer on said telephone while said telephone is in an uninterrupted on-hook state;

(4) if said ringer is temporarily disabled and said telephone remains in said uninterrupted on-hook state, automatically and immediately re-enabling said ringer in response to detection that said incoming call has been terminated, said step of automatically and immediately re-enabling said ringer being independent of any intermediate step; and (5) repeating said steps (1) through (4) for each subsequent incoming call to said telephone.

* * * * *